United States Patent [19]

Swain

[11] Patent Number: 5,466,114
[45] Date of Patent: Nov. 14, 1995

[54] SYSTEM FOR SUPPORTING HOLLOW CYLINDERS

[75] Inventor: Eugene A. Swain, Webster, N.Y.

[73] Assignee: Xerox Corporation, Stamford, Conn.

[21] Appl. No.: 837

[22] Filed: Jan. 5, 1993

Related U.S. Application Data

[63] Continuation of Ser. No. 548,312, Jul. 2, 1990, abandoned.

[51] Int. Cl.⁶ ................................................. B21C 37/30
[52] U.S. Cl. ...................... 414/746.5; 269/48.1; 414/910
[58] Field of Search ............................... 29/117; 82/113;
118/209, 500, 503, DIG. 11; 248/231.2;
269/48.1, 48.2, 48.3, 48.4; 279/2 R; 294/94,
95, 97; 414/745.1, 745.3, 746.4, 746.5,
746.8, 785, 910

[56] References Cited

U.S. PATENT DOCUMENTS

| | | |
|---|---|---|
| 2,233,070 | 2/1941 | Atwell et al. |
| 2,414,731 | 1/1947 | Forbes, Jr. ................................ 279/2 R |
| 2,809,044 | 10/1957 | Landreth ................................ 279/2 R |
| 3,016,856 | 1/1962 | Cummings ............................ 414/746.5 |
| 3,156,033 | 10/1964 | Brown. |
| 3,164,062 | 1/1965 | Hogden et al. ......................... 82/113 X |
| 3,181,762 | 5/1965 | Perrson ............................ 414/746.5 X |
| 3,262,730 | 7/1966 | Widmer ...................................... 294/94 |
| 3,365,158 | 1/1968 | Dowling. |
| 3,446,367 | 5/1969 | Anderson ........................... 414/746.4 X |
| 3,540,329 | 11/1970 | Gill ............................................ 82/113 |
| 4,104,937 | 8/1978 | Breaux ................................... 82/113 X |
| 4,143,774 | 3/1979 | Poulsen ................................. 414/746.5 |
| 4,168,073 | 9/1979 | LaRue ...................................... 279/2 R |
| 4,257,289 | 3/1981 | Groothius ................................. 82/113 |
| 4,615,243 | 10/1986 | Davis ..................................... 82/113 X |
| 4,720,114 | 1/1988 | Braitmaier et al. ................. 269/48.1 X |
| 4,753,563 | 6/1988 | Spillers ............................ 414/746.5 X |

Primary Examiner—Frank E. Werner
Assistant Examiner—Janice L. Krizek

[57] ABSTRACT

Apparatus and processes for supporting hollow cylinders including a cantilevered arm having a supported end and an unsupported free end and a plurality of rotatable wheels arranged concentrically around the outer periphery of and supported by the arm, the wheels being adapted to receive and support the interior of at least one hollow cylinder. This apparatus may be employed in a process for treating at least one hollow cylinder.

13 Claims, 6 Drawing Sheets

SYSTEM FOR SUPPORTING HOLLOW CYLINDERS

This is a continuation of application Ser. No. 07/548/312, filed Jul. 2, 1990, now abandoned.

BACKGROUND OF THE INVENTION

This invention relates in general to apparatus and processes for supporting cylinders.

Various techniques have been devised to clean and coat cylindrical substrates. Substrate support elements are necessarily postioned within the interior of the hollow cylinder to ensure noninterference with the application of the coating to the exterior surface of the cylinder. When hollow metal cylinders are coated with solutions of film forming polymers, variations in the texture and thickness of the coating occurs due to nonuniform heat transfer between the metal substrate and support elements within the hollow cylinder during heat drying and cooling of the coated cylinders. It is believed that the devices utilized to support the substrates tend to cause coating non-uniformities by drawing heat away from isolated contact spots on the substrate (heat sinking). Nonuniformity in the texture and thickness of the applied coatings is particularly undesirable for coatings in electrostatographic imaging members because even slight variations in the coating can adversely affect electrical properties of the final product. Moreover, some supports are attacked by solvents used during application of coatings to the substrates resulting in deterioration of the support. Also, repeated sliding contact between substrates and the support devices during reuse of the support devices can cause erosion of the support which in turn generates particulates that contaminate the final coating on the substrate. Further, depending upon the material utilized in the support, the support can be a source of undesirable vaporous contamination.

In addition, accurate allignment of a cylindrical substrate relative to the source of coating application devices can be difficult to achieve with many support devices. Where hollow cylinders are supported by cantilevered arms, particularly arms arranged concentrically around a central coating application source, careful control of the distance between the source of the coating material and the surface of the hollow cylinder to be coated is extremely important. Where there is play between the cantilevered arm and the interior of the supported hollow cylinders, the play can cause variations in distances between different locations on a given cylinder and the coating source.

Other disadvantages of prior art systems are the long cycle times to load and unload cylinders and the difficulty in automating these prior art systems.

One technique for spacing hollow sleeves from a cantilevered arm having cylindrical cross-section is to use endcaps on each end of the cylinder. The endcaps encircle the exterior of the end of each cylinder and have a flange which extends radially toward the mandrel. Thus, a cross-sectional view of a radial section of the endcaps would take on the appearance of a "T" or a "L" depending on whether the endcap is to be used on a single cylinder or for multiple cylinders where the ends of two cylinders are adjacent to each other. The end view of this type of endcap has the appearance of a washer. One intended purpose for using an endcap is to achieve uniform spacing between the exterior surface of the cylinder and the axis of the cantilevered supporting arm. However, rubbing of the endcap on the supporting cantilevered arm causes wear and eventually play. Also, the rubbing causes undesirable debris to form. Also endcaps have considerable mass and can cause nonuniform heating of the ends of the cylinders which, in turn, adversely affect coating uniformity.

INFORMATION DISCLOSURE STATEMENT

Dowling U.S. Pat. No. 3,365,158, issued Jan. 23, 1968—A can holder is described for use in a conveyor chain for conveying cans through a drying oven to dry coating material applied to the exterior of the cans. The holder includes a supporting rod that is attached at one end to the conveyor chain and extends from the chain in a horizontal direction. At least two spider-type fitments molded from relatively soft elastomeric material are mounted along the length of the rod. Each fitment has a hub and at least three flexible arms extending radially from the hub. The hub has a central opening that fits over the rod and arms are provided with hard wear tips at their outer arms. When a can is placed on the holder, the wear tips engage the interior wall of the can causing the arms to bow slightly which sets up elastic recovery forces in the arms resulting in the wear tips being firmly but gently pressed against the sidewall to retain the can in place. This arrangement is illustrated, for example, in FIG. 2.

Atwell et al. U.S. Pat. No. 2,233,070, issued Feb. 25, 1941—A holder for hollow articles is disclosed having longitudinally-spaced heads for clamping the hollow articles there between, each of the heads comprising a plurality of radially—and longitudinally—extending fingers arranged in space relation to each other with their adjacent ends connected together to provide a skeleton structure of generally conical form with the fingers of the opposite heads adapted to enter the opposite ends of the hollow articles and engage the latter at point spaced circumferentially of the inner edges thereof. This arrangement is illustrated, for example, in FIGS. 5 and 6 and described on page 2, right column, lines 45–62.

Brown U.S. Pat. No. 3,156,033, issued Nov. 10, 1964—A method of forming a glass-coated roller is described where a shaft (e.g. see FIG. 5) is employed to hold a substrate in place during the coating operation (e.g. see column 3, lines 50–56). Clearance is provided between supporting surfaces 21 and the interior of a shell 2.

The prior art support systems have, therefore, encountered difficulties in numerous areas including nonuniformity in the texture and thickness of the applied coatings, supports attacked by solvents used during application of coatings, erosion of the support, and generation of particulates that contaminate the final coatings. Also, prior art support systems have occasionally been a source of undesirable vaporous contamination. Further, inaccurate allignment of a cylindrical substrate relative to the source of coating application devices can prevent achievement of high tolerence coatings and play between a support arm and the supported hollow cylinders causing variations in distances to a coating source. Also, long cycle times to load and unload cylinders and difficulty in automation are undesirable in production environments. In addition, rubbing of endcapa on supporting arms cause wear and play and undesirable debris and also affect nonuniform heating of the ends and coating nonuniformity.

Thus, the characteristics of hollow cylinder support systems exhibit deficiencies for meeting the high precision and cleanliness requirements for substrates used for high quality coated devices.

SUMMARY OF THE INVENTION

It is an object of the invention to overcome the above-noted deficiencies by providing improved processes and apparatus for supporting hollow cylindrical substrates during various processing operations.

It is an another object of the invention to provide improved processes and apparatus for supporting hollow cylindrical substrates which withstands high temperatures without drawing heat away from isolated contact spots on the substrate (heat sinking).

It is still another object of the invention to provide improved processes and apparatus for supporting hollow cylindrical substrates which is resistant to coating solvents.

It is another object of the invention to provide improved processes and apparatus for supporting hollow cylindrical substrates which does not form particulate or vaporous contamination during use.

It is still another object of the invention to provide improved processes and apparatus for supporting hollow cylindrical substrates which position the substrates concentrically to the center line of the supporting apparatus.

It is another object of the invention to provide improved processes and apparatus for supporting hollow cylindrical substrates which promotes easy and rapid manual or automated loading and unloading of the substrates.

It is still another object of the invention to provide improved processes and apparatus for supporting hollow cylindrical substrates which reduces process cycle time.

These and other objects are accomplished by the present invention by providing apparatus and processes for supporting hollow cylinders comprising a cantilevered arm having a supported end and an unsupported free end and a plurality of rotatable wheels arranged concentrically around the outer periphery of and supported by the arm, the wheels being adapted to receive and support the interior of at least one hollow cylinder. This apparatus may be employed in a process for treating at least one hollow cylinder.

BRIEF DESCRIPTION OF THE DRAWINGS

A more complete understanding of the process and apparatus of the present invention can be obtained by reference to the accompanying drawings wherein.

DESCRIPTION OF THE PREFERRED EMBODIMENTS

Figure 1:
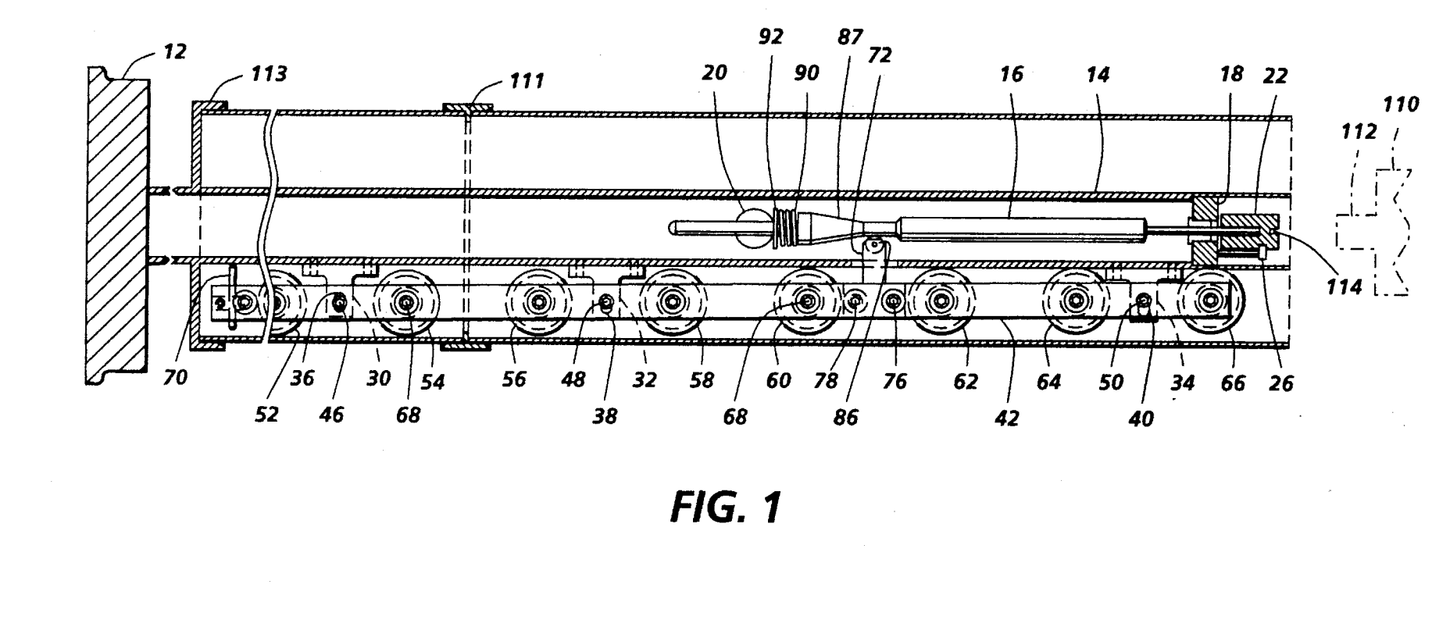
FIG. 1 is a schematic, sectional side view showing a support system during loading of hollow cylinders.
Figure 3:
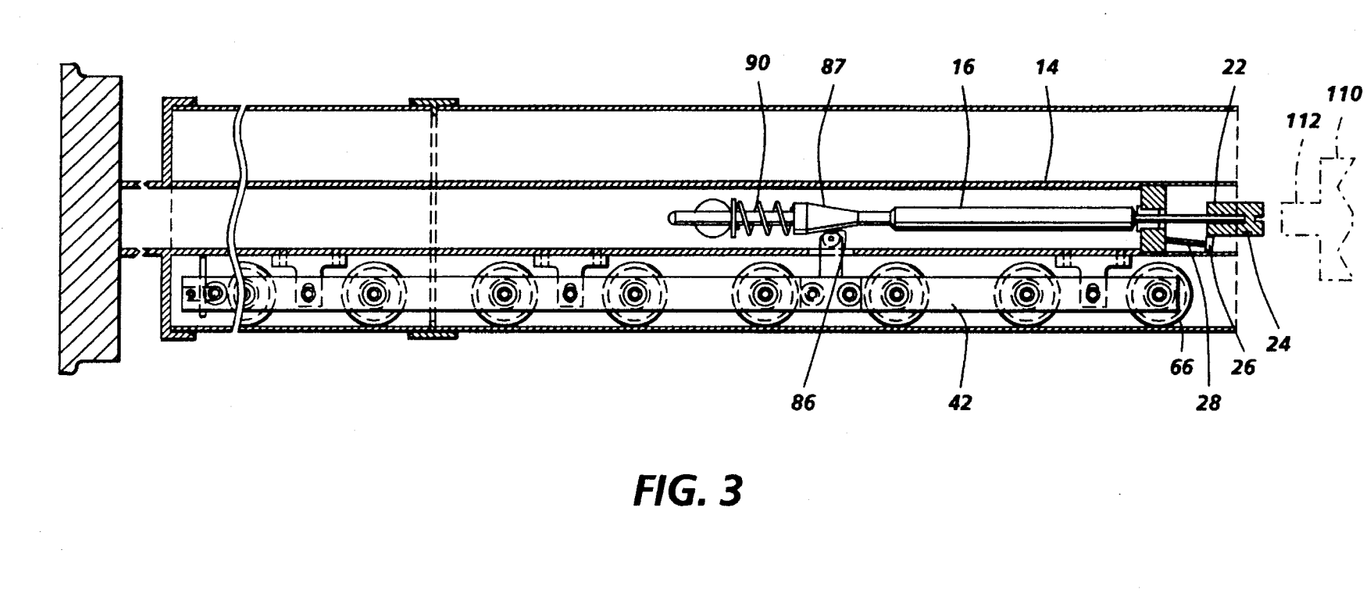
FIG. 3 is a schematic, expanded, sectional showing a support system after loading of hollow cylinders.
Figure 4:
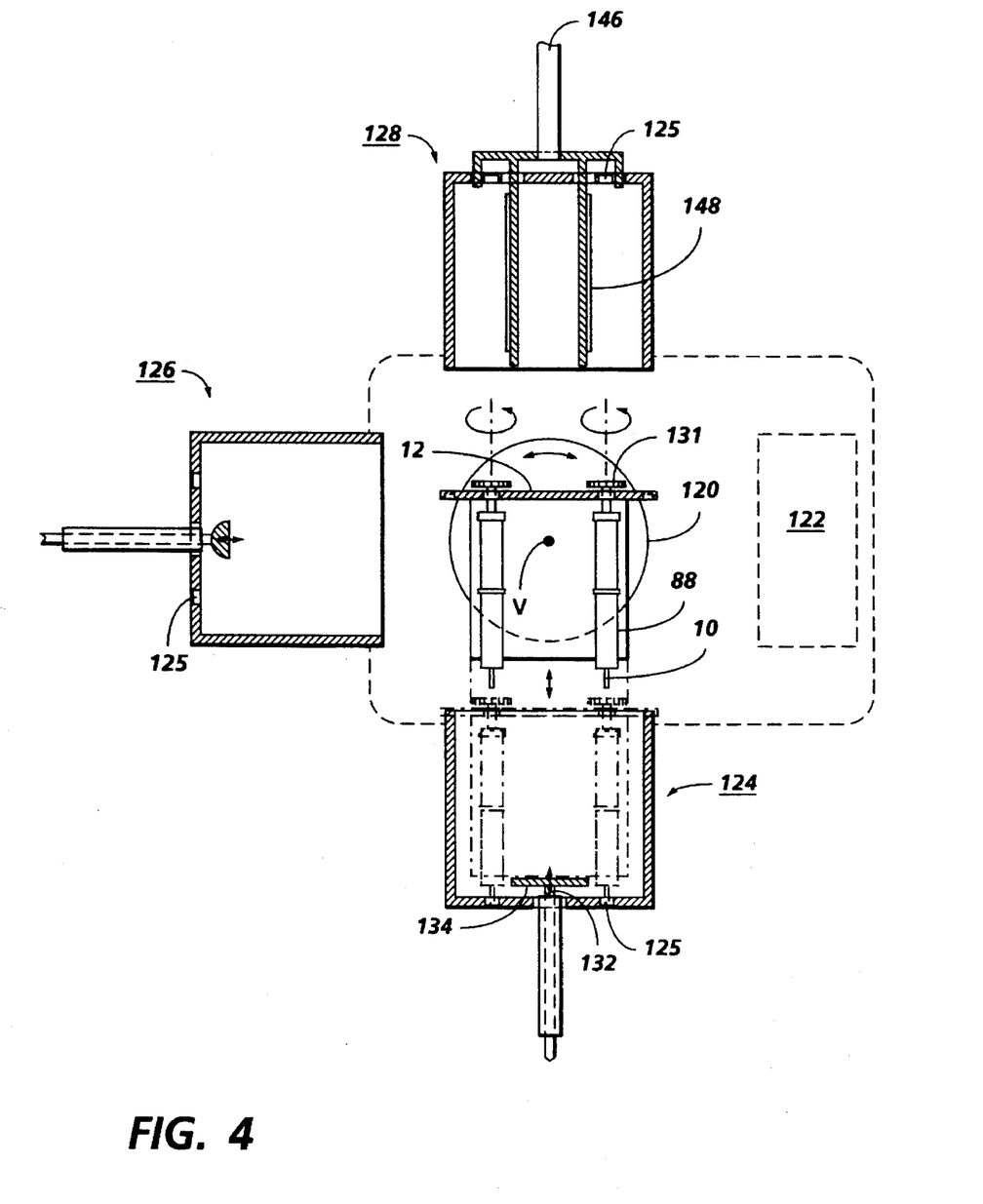
FIG. 4 is a schematic, overall, sectional plan view of a preferred apparatus and process in accordance with a preferred embodiment for processing hollow cylinders.

Referring to FIGS. 1 and 4, a cylindrical mandrel assembly 10 is shown cantilevered and supported from a support structure 12. Mandrel assembly 10 comprises a tube 14 having a cylindrical cross-section. Mounted within the interior of tube 14 is a shaft 16 supported at one end by bearing block 18 and at the other end by bearing post 20, both being afixed to and supported by the interior of tube 14. Bearing block 18 and bearing post 20 support and maintain shaft 16 coaxial with tube 14. Fixed to one end of shaft 16 is a button 22 containing a notch 24 (see FIG. 3) adapted to receive the head 26 of the retaining pin 28, the end of pin 28 opposite head 26 being secured to and supported by bearing block 18.

Mounted to the exterior of tube 14 are support pedestals 30, 32, and 34. These pedestals are fastened to tube 14 by suitable means such as screws or rivets. Also, pedestals 30, 32, and 34 carry slots 36, 38 and 40 respectively.

Figure 2:
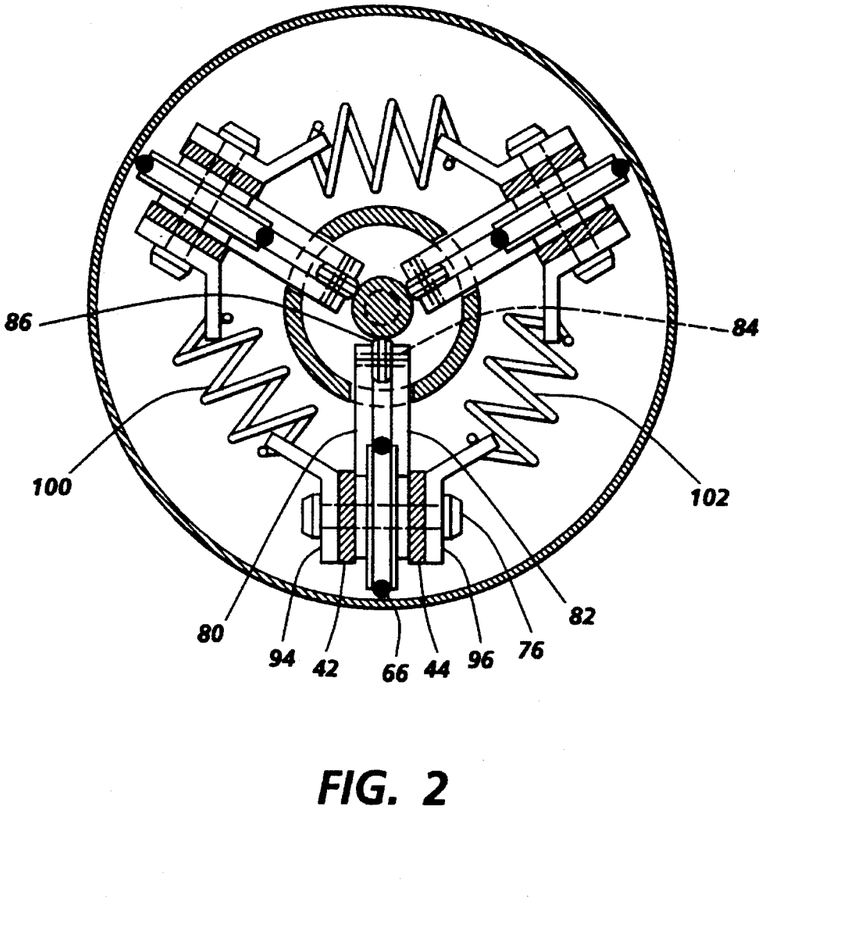
FIG. 2 is a schematic, expanded, sectional end view of a support system for hollow cylinders.

Referring to FIGS. 1 and 2, a pair of spaced rails 42 and 44 are shown which are parallel to and spaced from each other. Secured to rails 42 and 44 are guide pins 46, 48, and 50 and which ride in slots 36, 38, and 40 respectively.

Wheels 52, 54, 56, 58, 60, 62, 64, and 66 are positioned between rails 42 and 44 and at intervals along the length of rails 42 and 44. These wheels are fitted with tires 67 made from resilient, low thermal conductivity material. Wheels 52, 54, 56, 58, 60, 62, and 64 are retained as free wheeling members between rails 42 and 44 by means of an axle secured at each end to rails 42 and 44.

Referring to FIG. 1, one end of of each of rails 42 and 44 are spaced from tube 14 by means of adjustable set screw 70 which is supported in a threaded spacer member (not shown) secured to and mounted between rails 42 and 44.

Referring to FIGS. 1 and 2, an inverted "T" shaped member is sandwiched between rails 42 and 44 and secured thereto by screws 76 and 78. The inverted "T" shaped member 72 has a stem comprising two spaced apart legs 80 and 82. An axle 84 secured to one end of each of legs 80 and 82, the axle supporting a cam follower 86. Depending upon the position of cam follower 86 along the length of shaft 16 on cam 87, the free end of the pair rails 42 and 44 may be close to tube 14 as illustrated in FIG. 1 or close to the inner surface of hollow cylindrical substrate 88 and illustrated in FIG. 3.

As shown in FIG. 1, button 22 is locked into a depressed position because head 26 of resilient retaining pin 28 has dropped into notch 24 of button 22. This position of button 22 causes shaft 16 to compress spring 90 against washer 92 which in turn is retained in place by bearing post 20. Because spring 90 is compressed, it biases shaft 16 away from bearing post 20.

Figure 2A:
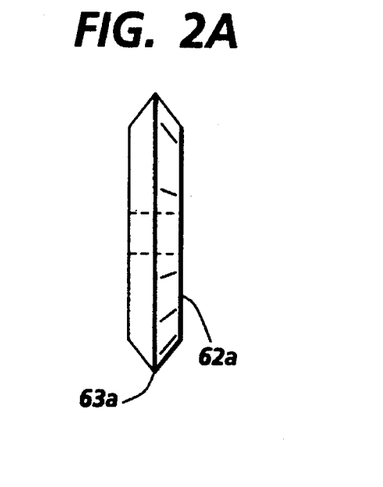
FIG. 2A is a schematic, expanded sectional view of a wheel having a knife edge cross-sectional shape.

Illustrated in FIG. 2A is a wheel embodiment comprising a wheel 62a having a knife edge cross-sectional shape 63a which can be employed in place of other configurations of wheels such as wheel 66 shown in FIG. 1.

In FIG. 2, flanges 94 and 96 are shown secured to rails 42 and 44 by screws 76. The ends of flanges 94 and 96 opposite the location of screws 76 and 78 contain holes which receive one end of springs 100 and 102, respectively. The rail assembly arrangement described above with reference to rails 42 and 44 are duplicated in at least two other positions located 120° apart around the periphery of tube 14 as illustrated in FIG. 2. Although less desirable due to increasing complexity, more than three rail assemblies may arranged around the periphery of tube 14. Since these identical rail assemblies are all biased toward shaft 16 by springs such as 100 and 102, the position of these rail assemblies relative to shaft 16 depends upon the location of the corresponding cam follower (e.g. cam follower 86 relative to cam 87. This relative position is controlled by the position of button 22 relative to the free end of tube 14. Thus, when button 22 is depressed, cam follower 86 is at its closest position to the axis of shaft 16 and the free ends of rails 42 and 44 (i.e. the ends adjacent wheel 66) are closest to the outer surface of tube 14 as shown in FIG. 1 to facilitate loading of substrate 88 onto the mandrel 10. Since a cross-sectional view of notch 24 in button 22 (viewed in a direction parallel to the axis of shaft 16) will show a shape similar to the letter "C", twisting of button 22 causes head 26 of resilient retaining pin 28 to ride out of slot 24 so that when button 22 is thereafter released, spring 90 will urge shaft 16 to move away from bearing post 20 and force cam follower 86 to ride up on cam 87. This causes the free end of rail assembly 42 and 44 to move toward the inner surface of hollow cylindrical substrate 88 to support substrate 88 and to maintain it in a coaxially aligned relationship with tube 14.

Although button 22 may be depressed and twisted manually to lock or unlock shaft 16 from a "load" position, such manipulation may also be carried out automatically. For example, a loading mandrel 110 (shown in phantom lines) may be suitably configured with, for example, a screwdriver blade-like projection (not shown) located at the end of finger 112. The screwdriver blade projection is adapted to mate with slot 114 at the free end of button 22 whereby rotation of loading mandrel 110 rotates button 22. Loading mandrel 110, therefore, is adapted to reciprocate toward and away from mandrel 10 and is also rotatable to enable depression and rotation of button 22. Obviously, any other suitable means may be utilized to mate the end of finger 112 with the free end of button 22. For example, typical mating relationships include a Phillips or Torque type receptacle adapted to receive a suitably shaped driver. If desired, the receptacle may be located at the free end of loading mandrel 110 rather than at the free end of button 22. Loading mandrel 110 may be of any suitable design. For example, it may be fitted with rails and wheels similar to the rails and wheels utilized for mandrel 10. When the free end of mandrel 110 is brought against the free end of mandrel 10, hollow cylindrical substrates 88 previously loaded on loading mandrel 110 may be laterally transferred from mandrel 110 onto mandrel 10.

Where hollow cylindrical substrate 88 is electrically conductive and mandrel 10 is utilized in an electrostatic coating system, electrical grounding of substrates 88 may be accomplished by any suitable means such as end-to-end or end to collar contact with mandrel 10 or through a flexible metallic leaf spring (not shown) mounted on rail 42 or 44 and in electrical contact with the interior of substrate 88. Rail 42 or 44 carrying the leaf spring is electrically grounded to metallic tube 14 through set screw 70 and/or through support pedestals 30, 32 or 34. If a plurality of hollow cylindrical substrates 88 are to be laterally transferred onto each mandrel 10, an optional partial ring collar 111 may be positioned between each adjacent cylindrical substrate 88 to mask the ends. However, such partial ring collars 111 may be omitted, if desired, because they are not needed to support substrates 88 in a concentric position relative to mandrel 10. Similarly, ring collar 113 is also optional and may be omitted. Substrate 88 may, if desired be abutted against support structure 12 or against a short spacing sleeve (not shown) between support structure 12 and the end of substrate 88. The spacing sleeve can, for example, resemble a shorter version of substrate 88. Preferably, any structure that may contact any of the ends of substrate 88 (except another substrate 88) comprises thermal insulating material which thermally isolates substrate 88 from other thermally conductive material thereby avoiding any significant heat sink effects.

If desired, any suitable temperature sensing device may also be mounted on mandrel 10.

Figure 5:
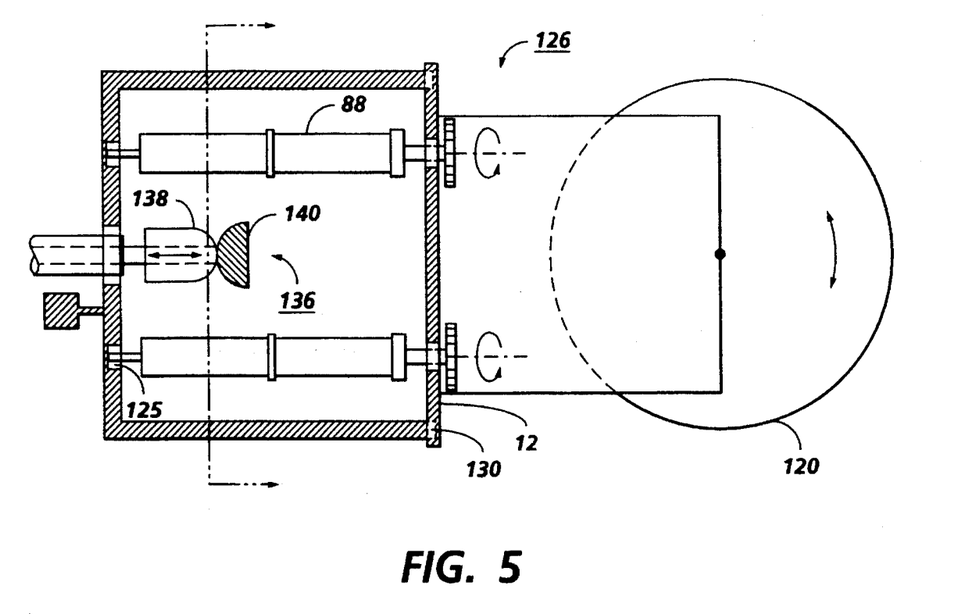
FIG. 5 is a schematic cross-sectional plan view of a coating chamber.
Figure 6:
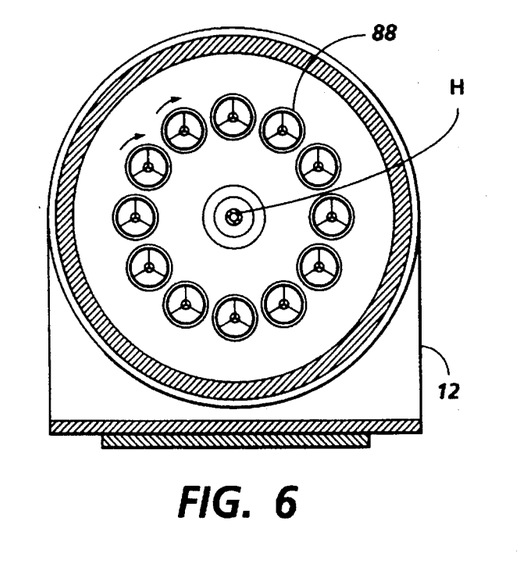
FIG. 6 is a schematic cross-sectional sectional elevational view of the coating chamber taken along lines X—X of FIG. 5.

In FIGS. 4, 5 and 6, a preferred embodiment is shown wherein a plurality of mandrels 10 are cantilevered from a single "L" shaped support structure 12. The axes of the plurality of mandrels 10 are arranged concentrically around a common axis perpendicular to support structure 12. Support structure 12 is, in turn, supported on rotatable carousel 120. Carousel 120 is rotatable so that the ends of mandrels 10 may be advanced to any one of several stations surrounding carousel 120 such as substrate loading/unloading station 122, cleaning station 124, coating station 126 and curing or drying station 128. All the stations 122, 124, 126, 128 and carousel 120 are preferably located within a class 100 or better clean area 130, which minimizes coating defects by eliminating exposure of substrate 88 to airborne contaminants.

As shown in FIG. 4, carousel 120 comprises a horizontal platform rotatable about a vertical axis V in either the clockwise or counterclockwise direction. The carousel is rotated by any suitable and conventional mechanism under the control of an operator and/or computer program. Support structure 12 preferably reciprocates along the horizontal platform of carousel 120 in a horizontal direction (represented by arrow AA) toward and away from the station facing the support structure, although it also is possible for the stations to reciprocate toward and away from the support structure. The reciprocation of the support structure or station is accomplished by any suitable and conventional mechanism under the control of the operator and/or computer program.

As best seen in FIGS. 4, 5 and 6, support structure 12 includes a planetary array of mandrels 10, each defining an offset horizontal axis radially spaced from a central horizontal axis H of the support structure 12. Each mandrel 10 is capable of carrying at least one hollow cylindrical substrate 88 (and preferably two substrates) so that support structure 12 provides a planetary arrangement of substrates 88, each substrate being parallel to but radially spaced from the central horizontal axis H. Preferably, mandrels 10 are located in an annular array at equal radii relative to central horizontal axis H so that substrates 88 are symmetrically positioned relative to horizontal axis H. Further, support structure 12 carries a mechanism for rotating each support arm 16 about its offset horizontal axis h so that each mandrel 10 in the planetary arrangement of substrates 88 rotates about its individual offset horizontal axis while being secured in a position parallel to but radially spaced from the central horizontal axis H. Support structure 120 may include any suitable mechanism for each rotating mandrel 10. The ends of substrates 88 supported on mandrel 10 may be covered by any suitable means such as a rotatable end cap or merely be abutted against a rotatable short sleeve.

The planetary arrangement of substrates 88 on mandrels 10 permits a large number of substrates to be processed simultaneously thereby increasing the throughput of the process and decreasing manufacturing costs. Each mandrel 10 can carry multiple substrates 88. Further, the coating and curing stations described below can perform their operations from the central axis H radially outward while each substrate 88 rotates about its individual axis so that each substrate 88 is processed in an equal manner due to the radial symmetry thus ensuring uniformity and versatility in processing.

Substrate (or substrates) 88 may be supported on mandrel 10 during only a single processing operation and thereafter removed from mandrel 10 or it may remain supported on mandrel 10 for additional processing operations. The mandrel supported substrate 88 may remain at a single location for different processing treatments or be moved to one or more different locations for further processing such as the application of coatings to form a photoreceptor. Multiple processing operations may be conducted while substrate 88 remains supported on mandrel 10 or a processed substrate 88 may be removed and additional unprocessed substrates 88 may be mounted onto mandrel 10 for processing. Thus, mandrel 10 may be transported to another location for further processing of the a processed substrate 88 supported thereon and another mandrel 10 carrying an unprocessed substrate 88 may be moved into position for processing. Alternatively, after the removal of a processed substrate 88, the original mandrel 10 may be used again to support a new unprocessed substrate 88 for cleaning.

Figure 7:
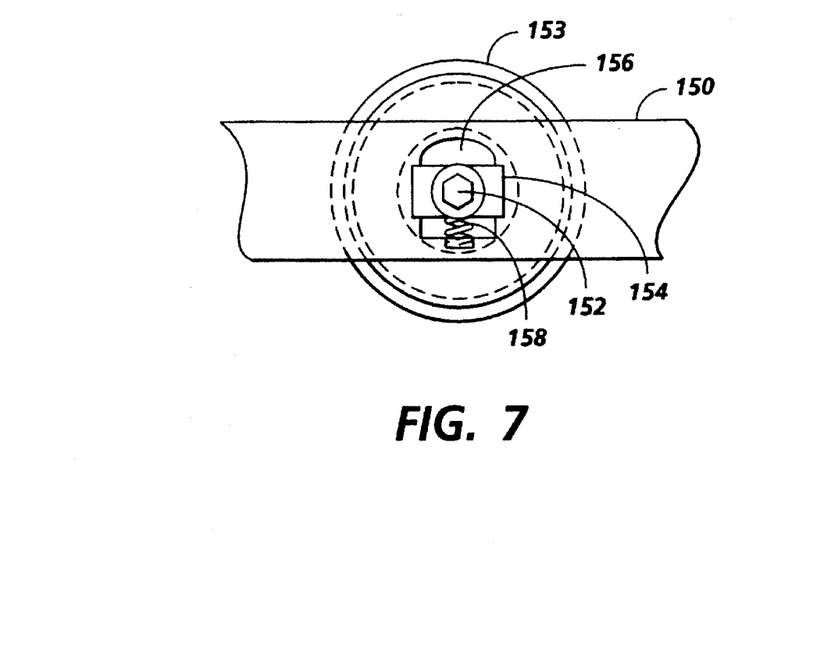
FIG. 7 is a schematic sectional elevational view of a spring loaded rotatable wheel assembly.
Figure 8:
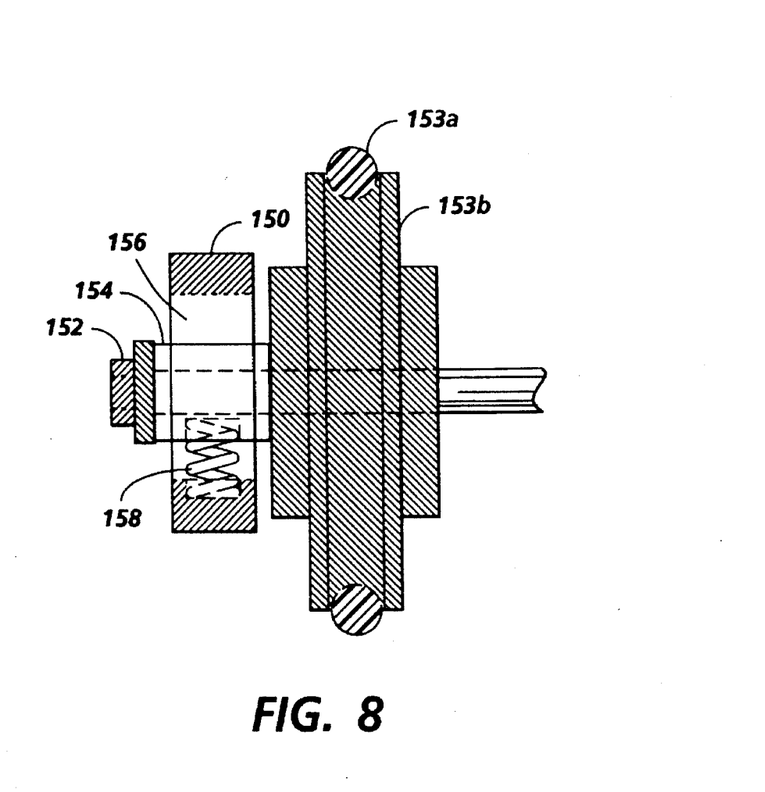
FIG. 8 is a schematic cross-sectional end view of the spring loaded rotatable wheel assembly shown in FIG. 7.

In operation, mandrel 10 is prepared for loading of at least one hollow cylindrical substrate 88 by ensuring that button 22 is depressed and locked with head 26 mated with notch 24 so that cam follower 86 is at the bottom of cam 87. This ensures that the free ends of rails 42 and 44 bearing wheel 66 are retracted toward tube 14 as illustrated in FIG. 1. There are at least three rail assemblies located around the periphery of tube 14, depression of button 22 causes the free end of all the rails surrounding tube 14 to retract toward the outer surface of tube 14. If desired, four or more rails may be utilized. However, the number of rails should not be so numerous that space constraints causes one rail to interfere with the operation of an adjacent rail. With the rails in the retracted or "load" position, one or more hollow cylindrical substrates 88 may be slid onto the mandrel either manually or automatically off loading mandrel 110. Where a plurality of cylindrical substrates are loaded onto mandrel 10, the ends of adjacent cylindrical substrates 88s may abut each other or, if desired, collar 114 may be inserted between adjacent cylindrical substrates 88 to mask the edge. When mandrel 10 carries a plurality of hollow cylindrical substrates 88, the total number depends upon factors such as the size and weight of substrates 88, the strength of mandrel 10 (e.g. its resistance to deflection), the capabilities of any coating system utilized, and the like. A typical substrate supporting system can, for example, comprise 16 cantilevered mandrels 10 carrying 2 substrates 88 per mandrel. Alternatively, if the outer periphery of the wheels such as wheels 52, 54, 56, 58, 60, 62, 64, and 66 have a substantially thick layer of resilient, compressible material such as hexafluoropropylene (Viton, available from E.I. du Pont de Nemours & Co.), all the rails may be fixed in place and retraction of the rails will be unnecessary. The substantially thick layer of resilient, compressible material may, for example, simply be an "O" ring "tire" supported in a groove around a more rigid "hub" material. The expression "resilient, compressible material" is defined herein as a material having a Durometer SHORE A hardness of between about 40 and about 70. The expression "substantially thick layer" is defined herein as a thickness of at least about 10 percent of the radius of the wheel. Instead of being supported on fixed rails, the axles of the rotatable wheels bearing a substantially thick layer of resilient, compressible material around their periphery may be mounted on pedestals similar to the pedestals 30, 32 or 34, thereby omitting any need for rails. Further, the use of individual pedestals allows the wheels to be arranged in any suitable pattern around the outer surface of the mandrel, e.g. in rows, staggered patterns or even randomly so long as a sufficient number of wheels are deployed around the periphery of the mandrel to maintain the substrate coaxial with the mandrel. Alternatively, as shown in FIGS. 7 and 8, the rails 150 may be fixed if the axles 152 of the rotatable wheels comprising a tire 153a supported on a hub 153b are mounted in bearing blocks 154 which are slidably mounted in slot 156 in rails 150 and which are biased away from the centerline of the mandrel (not shown) by spring 158. The arrangement illustrated in FIGS. 7 and 8 permit the mounting of cylindrical substrates 88 in a subsequent run having a different inside diameter than cylindrical substrates 88 processed in a previous run. Alternatively, the arrangement shown in FIGS. 1 and 3 may also be readily adjusted to accommodate cylindrical substrates 88 having different inside diameters by merely changing the setting of adjustable set screw 70 and replacing button 22 with another button (not shown) having a notch 24 located a different distance from cam 87 or replacing shaft 16 with a cam 87 having a sloped surface having a different pitch.

After loading hollow cylindrical substrates 88 onto mandrel 10, button 22 is rotated to cause head 26 to ride out of notch 24. Unlocking of button 22 allows spring 90 to push shaft 16 toward the free end of mandrel 10. This movement causes cam follower 86 to ride up onto the inclined surface of cam 87 thereby driving the free end of the pair of rails 42 and 44 away from the outer surface of tube 14 and toward the interior surface of cylindrical substrate 88 whereby all the rotatable wheels carried by rails 42 and 44 engage the inner surface of cylindrical substrate 88. Similarly, the wheels carried by the other rail assemblies arranged around the periphery of tube 14 also engage and support the interior of cylindrical substrate 88 to ensure coaxial alignment of the cylindrical substrate with tube 14. The rotatable wheels carried by rails 42 and 44 function as a low friction thermal barrier and may comprise any suitable thermally insulating material coated onto the wheels or even comprising each entire wheel. The rotatable wheels minimize both friction an surface area contact with the interior surface of cylindrical substrate 88 of and provide thermal isolation from the heat sinking mass of rails 42 and 44. Typical thermally insulating materials include glass filled polytetrafluoroethylene (Teflon, available from E.I. du Pont de Nemours & Co.), copolymers of vinylidene fluoride and hexafluoropropylene (Viton, available from E.I. du Pont de Nemours & Co.) silicone rubber, polyester, ceramics, and the like. Wheels made entirely of rigid materials such as ceramics are normally employed in embodiments where the entire wheel is retracted and extended during lateral transfer of the substrate 88 onto and off of mandrel 10. Wheels that comprise highly flexible materials are preferably thick along the axle or have a hub region that comprises a more rigid material to prevent undue wobbling of the wheels as they turn. The thermally insulating materials should preferably be resistant to degradation at high temperatures as high, for example, as about 177° C. (350° F.). To minimize the contact area between substrate 88 and the rotatable wheels, the cross-sectional shape of the outermost edge of the wheels may, if desired, have a knife edge configuration. Cylindrical substrates 88 carried by mandrel 10 are thereafter processed. For example, the tubes may be transported to a cleaning station, a coating station and a drying station, all of which may be different or the same station. After processing, the processed cylindrical substrates 88 are unloaded by depressing button 22 and, if desired, rotating button 22 until head 26 engages notch 24. Depression of button 22 causes cam follower 86 to ride down inclined cam surface of cam 87 and disengage most of the wheels carried by rails 42 and 44 from the inner surface of cylindrical substrate 88. The treated cylindrical substrates 88 may thereafter be readily moved from mandrel 10 by laterally transfering them onto mandrel 10.

The overall operation of a preferred embodiment is shown in FIGS. 4, 5 and 6, wherein carousel 120 rotates about vertical axis V to position the planetary array of substrates 88 before any one of stations 122, 124, 126 or 128. Once in position, support structure 12 reciprocates in a horizontal direction relative to the desired station to insert the planetary array of substrates 88 into the station. If the station includes a processing chamber, the support structure 12 preferably includes a sealing mechanism 130, such as a gasket, about its periphery so that support structure 12 functions as a closure member for sealing the chamber with substrates 88 located therein. Substrates 88 are then processed within the sealed chamber, with each substrate 88 rotating about its horizontal axis which is offset from central horizontal axis H of support structure 12. Once processed, support structure 12 is retracted from that station and carousel 120 rotates to position the array of substrates 88 for insertion into the next processing station.

The individual processing stations are preferably arranged in a symmetrical manner around the carousel 120. The basic processing steps may include loading, cleaning, coating, drying and unloading substrates 88.

Loading of substrates 88 may be accomplished at loading/unloading station 122. Uncoated substrates 88 are loaded onto each mandrel 10 extending from the support structure 120, either manually or other suitable technique such as a programmed robot arm (not shown). Each substrate 88 is loaded onto and aligned concentrically with the axis of cantilevered mandrels 10. The axes of mandrels 10 are maintained parallel to and radially spaced from central horizontal axis H.

Cleaning of substrates 88 may be performed at the cleaning station 124. Carousel 120 first rotates clockwise in FIG. 4, preferably about 90°, to position support structure 12 in front of cleaning station 124 which includes a cleaning chamber having a central horizontal axis colinear with central horizontal axis H of the support structure 12. Support structure 12 is then extended toward the cleaning chamber 124 to insert the planetary array of substrates 88 into the chamber of cleaning station 124. When the support structure 12 closes against the open end of cleaning chamber 124, the sealing mechanism 130 (see FIG. 5) seals the chamber 124 with substrates 88 loaded therein. Once inside the chamber of cleaning station 124, substrates 88 are cleansed by any suitable technique such as liquid detergents, Freon, or ozone with simultaneous exposure to ultraviolet light. Substrates 88 are rotated on their cantilevered mandrels 10 about their horizontal axes during the cleaning operation so that each substrate is cleaned uniformly over its entire exterior surface. The free end of the mandrels 10 may be supported by bearing blocks 125 while the mandrels 10 and substrates 88 are rotated. Substrates 88 preferably rotate during the cleaning operation at between about 30 and about 200 rpm. Rotation of each mandrel 10 may be effected by any suitable means such a as an electric motor (not shown) which is connected by suitable means to gears 131. The atmosphere in cleaning chamber 124 may then be exhausted and substrates 88 are withdrawn from the chamber 124 by reverse retraction of support structure 12.

In a typical embodiment, substrates 88 are cleaned by exposure to a high pressure spray of a solvent based cleanser, such as a Freon or detergent based solvent. The spray preferably emanates from a central, reciprocatable conduit 132 located along the central horizontal axis of the cleaning chamber of cleaning station 124, but other cleansing structures are may be utilized including dedicated nozzles, e.g., a structure wherein each nozzle in an array of nozzles is directed at a particular substrate. The central conduit 132 can comprise a series of nozzles 134 located therein for distributing the cleanser radially outwardly from central conduit 132 through all the nozzles simultaneously. Central conduit 132 and nozzles 134 may reciprocate to provide a sequential spray of cleansing material along the axis of each substrate. The reciprocating conduit 132 can be moved back and forth by any conventional mechanism under a programmed control to ensure adequate spray coverage through nozzles 134. The spray from central conduit 132 emanates radially outward, as the substrates 88 are rotating about their horizontal axes, thus optimizing the coverage of all substrates 88 with regard to angular impingement, spray pressure and distance from the spray nozzles. The flow rate of the cleanser and the time of spraying within the cleaning chamber of cleaning station 124 are variable depending, for example, on the cleanser material and substrates 88 to be cleaned. Once cleaned, the excess cleanser in the cleaning chamber is drained and any excess vapor is evacuated via any suitable drain/exhaust mechanism (not shown) in the cleansing chamber of cleaning station 124. The cleansing chamber can also be equipped with an air supply mechanism (as part of or separate from the central conduit 132) to supply air at sufficient temperatures to equilibrate the substrates to the required process temperature (to counteract evaporative cooling) and to reduce vapor emissions from the chamber. When the appropriate temperature and vapor conditions are achieved, the support structure 12 retracts the array of substrates 88 from cleaning chamber 124 and moves the array to coating station 126 for further processing.

Substrate 88 may be coated at coating station 126. Carousel 120 rotates clockwise preferably about another 90° to position the planetary array of cleaned substrates 88 before the coating station 126 which includes a coating chamber having a central horizontal axis colinear with the central horizontal axis H of the support structure 12. The support structure 12 then advances to insert the planetary array into the coating chamber 310 with the sealing mechanism 20 sealing the chamber. The substrates are then coated (via mechanisms described below) with a coating solution containing one or more materials useful, for example, in electrophotography. When the coating process is complete, the substrates 88 are withdrawn from the coating chamber 126 by retraction (reverse reciprocation) of support structure 12.

In a preferred embodiment, substrates 88 are coated using a solvent/polymer solution expelled from an electrostatic rotary atomizer 136 (FIG. 5) which may be any suitable commercially available device, such as a DeVILBISS, Aerobell, Graco CA 1000, CT 4000 or Resistive Micro-Bell rotary atomizer. Generally an electrostatic rotary atomizer 136 includes two parts: an atomizer housing 138 enclosing rotary turbine blades (not shown) and feed conduits (not shown) for a coating solution and a solvent; and a rotating bell or cap 140 spaced from one end of the atomizer housing 138. In operation, the coating solution and solvent are expelled through injection ports at the end of the atomizer housing 138 against the rotating bell or cap 140, which atomizes the coating solution and solvent and directs a charged spray radially outward from the rotary atomizer. As the bell or cap 140 rotates, atomizer 136 can be reciprocated in a path parallel to the axes of substrates 88 to be coated. An suitable and conventional mechanism may be utilized for rotating and reciprocating the atomizer 136. The planetary arrangement of horizontal substrates 88 surrounding the reciprocating path of electrostatic rotary atomizer 126 are thus positioned in a symmetrical configuration with respect to the spray cloud produced by the rotary atomizer 136. Each substrate 88 thus receives a uniform coating. To enhance the application of the coating, a rapidly evaporating solvent may first be sprayed into the sealed coating chamber (via a mechanism described below) to obtain a preset vapor pressure of up to saturation point of the air within the chamber. The coating solution containing the same rapidly evaporating solvent is then sprayed using the electrostatic rotary atomizer 136 while rotating substrates 88 and reciprocating atomizer 136 back and forth along the central axis H in the center of the planetary array of substrates.

The use of reciprocating rotary atomizer 136 centrally located in the planetary array of rotating substrates 88 has several advantages. In addition to applying a uniform coating to substrates 88, the atomization and curing processes are separated allowing each process to be better defined and controlled. In addition, rapidly evaporating solvents may be used to reduce the drying requirements by reducing the drying time and the energy required for drying. The centralized location of atomizer 136 in a sealed chamber with a planetary array of rotating horizontal substrates 88 also provides for a narrow distribution of small droplets which allows for a uniform thin coating on all substrates without typical coating defects such as "orange peel" effects.

In a preferred embodiment, the coating formulation of a coating solution and solvent are expelled at between about 50 and about 400 cc/minute at an atomizer speed of between about 15,000 and about 60,000 rpm, a reciprocation speed of between about 5 and about 40 mm/sec, and an electrostatic voltage between about 30 and about 150 kilovolts (plus or minus polarity of charge). The coating formulation preferably has a concentration of between about 0.5 and about 50 percent solids and a viscosity of between about 1 and about 1000 centipoises. The substrates 88 are rotating at between about 20 and about 100 rpm in a coating chamber having a temperature of between about 0 and about 30° C. The free end of the mandrels 10 may be supported by bearing blocks 125 while the mandrels 10 and substrates 88 are rotated. The coating formulation can include coating any suitable material such as nylon, polyester or polycarbonate; and solvents such as methylene chloride, toluene, methanol, or ethanol. All the parameters discussed above may vary depending on the coating solution , solvent and desired type of coating.

After the coating is applied and leveled to a smooth film, the solvent vapor is removed by controlling evaporation of the solvent from the film. The controlled evaporation may be accomplished by recirculation of a suitable solvent saturated gas mixture through the chamber by opening dampers (not shown) and activating a recirculation blower (not shown). The rate of solvent removal may be controlled by either controlling the gas recirculation flow rate (via blowers and dampers) and/or controlling the temperature in chiller coils (not shown) which condenses the solvent out of the gas stream. In either case, a heater (not show) can be used to reheat the incoming gas stream. When the solvent vapor concentration has been sufficiently lowered and the film is in a sufficiently viscous state, the gas recirculation is stopped and the support structure 12 retracts to remove the substrates 88 from the coating chamber. Alternatively, a subsequent coating layer may be applied as noted above prior to retraction of support structure 12.

The coating chamber may be further modified for fabrication of vacuum coated photoreceptor devices. For example, in addition to the structure for applying coatings via the rotary atomizer, the chamber could be fabricated with stronger walls, vacuum service lines 144 (FIG. 5) and vacuum tight seals so that vacuum deposition of thin films could be performed in the chamber of coating station 126 of as well as solvent based rotary atomization spray coating. This dual capability permits production of different kinds of photoreceptors having a vacuum coating and an atomizer applied coating using the same apparatus.

The fourth operation is film curing or drying at curing station 128. Carousel 120 rotates clockwise preferably another 90° to position the planetary array of coated substrates 88 in front of the curing chamber of curing station 128. Like the chamber of coating station 126, the curing chamber of curing station 128 also defines a central horizontal axis colinear with the central horizontal axis H of the support structure 12. The support structure 12 is then advanced to insert the planetary array of substrates 88 into the chamber of curing station 128. If there is solvent present in the coated film, it is removed by exposure to high velocity heated air (e.g., 4000 cfm at between about 60° and about 140° C. for between about 1 and about 5 minutes). If the film is photochemically reactive, the film is cured by exposure to ultraviolet light. When curing is complete, substrates 88 are cooled by chilled air (if necessary) and then withdrawn from the chamber. If a multilayered film structure is desired, the coating and curing operations are repeated as necessary with the carousel 120 cycling between the coating station 126 and and curing station 128.

In a preferred embodiment, the curing chamber of curing station 128 includes a drying mechanism to remove solvent from the freshly coated film on substrates 88 by exposing them to a heated stream of high velocity air as substrates 88 rotate. The drying mechanism may include a source of air (not shown) and heating source (not shown) to control the temperature of the air entering inlet 146. A perforated plenum 148 is located along the horizontal axis H of the chamber of curing station 128 so as to be surrounded by the planetary arrangement of substrates 88. Clean heated air flows radially outward through perforated plenum 148 at high velocity, and impinges on the rotating outer surfaces of coated substrates 88 (rotating at between about 20 and about 100 rpm). The free end of the mandrels 10 may be supported by bearing blocks 125 while the mandrels 10 and substrates 88 are rotated. The high velocity air minimizes the boundary layer, and the resultant high heat and mass transfer rates permit rapid solvent removal. Although a perforated plenum wall 148 is shown, other configurations such as an air-fed cylinder located along the central axis H and having nozzles aligned axially with the individual substrates 88 may be used to impart high velocity air to the rotating substrates 88. Alternatively, the curing chamber of curing station 128 may include an array of dedicated nozzles, each being directed to expel air toward a particular substrate 88. The air supply temperature and flow rate are optimally controlled to minimize curing time without compromising coated surface quality and imaging performance. When the coated layer is cured adequately, the air supply temperature is lowered to below ambient temperature to rapidly cool substrates 88 to ambient temperature. Carousel 120 then returns the planetary array of substrates 88 to the coating chamber of coating station 126 for further layer applications or to the load/ unload station 122 if coating and drying is complete. The planetary arrangement of substrates 88 with the central plenum 148 structure provides a system which reduces drying times and reduces temperature variations in the substrate. The use of a planetary array of substrates in combination with various processing stations is disclosed in copending U.S. patent application Ser. No. 07/457,926, filed on Dec. 27,1989 in the names of J. Hammond et al, copending U.S. patent application Ser. No. 07/458,571, filed on Dec. 27,1989 in the name of E. Swain and copending U.S. patent application Ser. No. 07/457,927, filed on Dec. 27,1989 in the name of E. Swain. The entire disclosures of these patent applications are incorporated herein by reference.

Electrical power to drive electrical equipment such as motors, solenoids, servomotors and the like are supplied through suitable wiring and conventional suitable electrical switching. Valves and switches are usually actuated through suitable circuitry in response to a signal from a conventional programmable controller. Thus, the control functions in the apparatus of this invention may be synchronized and integrated with any suitable programmable controller (not shown) such as an Allen Bradley Programmable Controller, Model No. 2/05 or Model No. 2/17. The programmable controller responds to various typical inputs including, for example, inputs from limit switches, timers, encoders, proximity sensors, counters and the like and utilizes these inputs for sequencing program outputs to activate electric switches, solenoid operated valves and the like. Termination of an activated component may be effected by any suitable and conventional means such as by the programmable controller or by suitable limit switches.

Any suitable cylindrical sleeve substrate may be processed using the apparatus and process of this invention. The substrate may comprise a single layer or a plurality of layers in which the layers comprises suitable plastic, metallic material, and the like and combinations thereof. Typical plastic materials include polyethylenes, polypropylenes, polycarbonates, polyvinylacetate, terephthalic acid resins, polyvinylchloride, styrenebutadiene copolymers and the like. Typical metallic materials include aluminum, stainless steel, brass, titanium, and the like. The sleeve substrate may be of any suitable thickness which will allow cleaning without collapsing or cracking. Preferred sleeve thicknesses for use with the mandrel can range from between about 1 millimeter to about 6 millimeters. Thicker substrates may be utilized as long as sufficient support can be provided by a cantilevered mandrel. Substrates having a thickness up to about 12 centimeters may be cleaned with the process and apparatus of this invention.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

In a control experiment, a cantilevered mandrel comprising a stainless steel metal tube having an outside diameter of about 4.9 cm, a length of about 142 cm and a thickness of about 5 mm was employed to support a hollow cylindrical aluminum substrate having a diameter of about 8.4 cm, a length of about 31 cm and a thickness of about 1.2 mm. The hollow aluminum sleeve substrate was prepared for loading by first sliding metallic ring collars onto the ends of the hollow cylindrical substrate. The ring collars resembled a large "washer" having a ring like flange along its periphery. This ring like flange had an inside diameter slightly larger than the outside diameter of the cylindrical aluminum substrate so that the flange formed a collar around an end of the aluminum substrate with the "washer" portion abutting against the end of the aluminum substrate. The hole in the "washer" had a diameter that was slightly larger than the outside diameter of the cantilevered mandrel metal tube so that after the resulting assembly was slid onto the cantilevered mandrel from its free end, the ring collar positioned the aluminum substrate concentrically around the cantilevered mandrel metal tube.

The mounted cylindrical substrate was then spray coated with a solution comprising 1 percent by weight polyester resin, 1 percent by weight submicron sized photosensitive particles, 59 percent by weight methylene chloride solvent and 39 percent by weight 1,1,2 trichloroethane solvent. The wet coating thickness was about 50 micrometers. The mounted coated cylindrical substrate was then dried in an oven at 100° C. for about 5 minutes to form a dried coating having a thickness of about 1 micrometer. The coated cylindrical substrate was thereafter removed from the mandrel by sliding the substrate onto an adjacent unloading mandrel. Coating defects were observed on the outer surface of the cylindrical substrate in the areas adjacent the ring collars. More specifically, the coating defects were granular spray induced microstructures which were caused by accelerated drying due to non-uniform temperature conditions at the ends of the substrate where the metallic ring collars are in contact with both the substrate and the metal mandrel.

EXAMPLE II

An expandable, cantilevered mandrel similar to that shown in FIGS. 1, 2 and 3 was prepared for loading a hollow cylindrical substrate having a diameter of about 8.4 cm, a length of about 31 cm and a thickness of about 1.2 mm by depressing a button located at the free end of the mandrel to lock the button by mating a notch in the button with a retaining head. Since the button was mounted on the end of a spring loaded shaft carrying a cone shaped cam, depression of the button caused cam followers riding on the cam to to move to the thinnest part of the cam. This caused the free ends of three pairs of spaced apart rails bearing 12 wheels between each pair of rails to retract 4.8 mm toward a metallic tube which surrounded and was coaxial with the spring loaded shaft. The free ends of the three pairs of spaced apart rails were spring loaded to bias the free ends toward the tube. One end of each pair of rails remained substantially stationary due to the presence of a set screw which maintained a fixed spacing between the rail pairs and the outer surface of the tube. The metallic tube had an outside diameter of about 4.1 cm and a length of about 80 cm and one end was secured to a horizontally reciprocatable support member. Each wheel had an outside diameter of about 1.6 cm and comprised a plastic rim carrying a resilient hexafluoropropylene (Viton, available from E.I. du Pont de Nemours & Co.) tire having a cross-section of 2.5 mm. Each rail in each pair of rails had an overall length of about 59.2 cm and a cross-sectional width of 0.47 cm and cross-sectional height of 1.27 cm and was spaced from the other rail in the pair by a distance of about 9.5 mm. The wheels were evenly spaced along the length of each pair of rails and each wheel was freely rotatable around an axle supported at each end by the adjacent rail. The pairs of rails or rail assemblies were positioned 120° apart from each other around the periphery of the tube. While the button remained depressed and the free end of all the rails surrounding the tube were retracted toward the outer surface of the tube. With the rails in the retracted or "load" position, the hollow aluminum sleeve substrate was prepared for loading by sliding ring collars onto the ends of the hollow cylindrical substrate. The resulting assembly was laterally transferred onto the cantilevered mandrel from its free end.

After loading the hollow cylindrical substrates onto the mandrel, the button was rotated to cause the retaining head to ride out of the notch in the button. Unlocking of the button allowed the spring loaded shaft to move toward the free end of the mandrel and causes the cam followers to ride up onto the inclined surface of the cam thereby driving the free end of the rails away from the outer surface of the tube and toward the interior surface of the cylindrical substrate whereby all the rotatable wheels carried by the rails engage the inner surface of the cylindrical substrate. Since the wheels carried by all the rail assemblies arranged around the periphery of tube engaged and supported the interior of the cylindrical substrate coaxial alignment of the cylindrical substrate with the tube was ensured. The mounted cylindrical substrate was then spray coated with a solution comprising 1 percent by weight polyester resin, 1 percent by weight submicron sized photosensitive particles, 59 percent by weight methylene chloride solvent and 39 percent by weight 1,1,2 trichloroethane solvent. The wet coating thickness was about 50 micrometers. The mounted coated cylindrical substrate was then dried in an oven at 100° C. for about 5 minutes to form a dried coating having a thickness of about 1 micrometer. The coated cylindrical substrate was thereafter unloaded by depressing the button and rotating it until the retaining head engaged the notch in the button. Depression of the button caused the cam followers to ride down the inclined cam surface and disengage at least the wheels carried near the free end of the pairs of rails from the inner surface of the cylindrical substrate. The coated cylindrical substrate was thereafter readily moved from the mandrel by laterally transfering them onto an adjacent unloading mandrel. Since the rotatable wheels carried by the rails functioned as a low friction thermal barrier no coating defects were observed on the outer surface of the cylindrical substrate in the areas that corresponded to the positions of the wheels on the opposite side of the cylindrical substrate wall.

Although the invention has been described with reference to specific preferred embodiments, it is not intended to be limited thereto, rather those skilled in the art will recognize that variations and modifications may be made therein which are within the spirit of the invention and within the scope of the claims. For example, the concept of this invention may also be utilized for the processing of various types of electrostatographic devices such as selenium alloy photoreceptors or ionographic devices.

What is claimed is:

1. Apparatus for supporting hollow cylinders comprising a cantilevered arm having a supported end and an unsupported free end and a plurality of independently rotatable wheels having centers intersecting the outer periphery of an imaginary sleeve coaxial with the longitudinal axis of said arm, said wheels being rotatable around and supported by axles extending through the center of said wheels, said axles being supported by said arm, each of said axles being transverse to said longitudinal axis of said arm and tangent to said outer periphery of said imaginary sleeve, said wheels having an outer periphery adapted to receive, contact and support the interior of at least one hollow cylinder, said wheels having an outer periphery adapted to provide the sole contact with the interior of at least one hollow cylinder and said wheels providing the sole support of said at least one hollow cylinder.

2. Apparatus according to claim 1 wherein at least three rails arranged (1) parallel to said outer periphery of said imaginary sleeve and, (2) parallel to said longitudinal axis of said arm are supported by said arm and said plurality of independently rotatable wheels are mounted on said axles along the length of each of said rails.

3. Apparatus according to claim 2 wherein at least one end of at least one of said rails is retractable toward said longitudinal axis of said cantilevered arm.

4. Apparatus according to claim 2 wherein at least two of said rails are fixed in position relative to the longitudinal axis of said cantilevered arm.

5. Apparatus according to claim 4 wherein all of said rails are fixed in position relative to said longitudinal axis of said cantilevered arm and said rails comprise means to bias said wheels away from said longitudinal axis of said cantilevered arm.

6. Apparatus according to claim 5 wherein said means to bias said wheels away from said longitudinal axis of said cantilevered arm comprises spring loaded bearing blocks supporting the axles of said rotatable wheels.

7. Apparatus according to claim 1 wherein said outer periphery of said wheels comprise a resilient, compressible material having low thermal conductivity.

8. Apparatus according to claim 1 wherein said outer periphery of said wheels comprise a rigid material having low thermal conductivity.

9. Apparatus according to claim 1 wherein said outer periphery of said wheels has a knife edge cross-sectional shape.

10. Apparatus according to claim 2 wherein said cantilevered arm comprises means to alter the distance of said rails from said longitudinal axis of said cantilevered arm to support hollow cylinders having different inside diameters.

11. Apparatus according to claim 10 wherein said means to alter the distance of said rails from said longitudinal axis of said cantilevered arm comprises at least one set screw at at least one end of said rails.

12. Apparatus according to claim 2 wherein said apparatus for supporting hollow cylinders comprises said cantilevered arm mounted on a rotatable carousel having an axis of rotation perpendicular to said longitudinal axis of said arm.

13. Apparatus according to claim 2 wherein said wheels provide the sole contact with and support for at least two hollow cylinders.

* * * * *